(12) United States Patent
Hagihara (10) Patent No.: US 12,038,059 B2
(45) Date of Patent: Jul. 16, 2024

(54) POWER TRANSMISSION DEVICE (71) Applicant: EXEDY Corporation, Neyagawa (JP)

(72) Inventor: Yoshiyuki Hagihara, Neyagawa (JP)

(73) Assignee: EXEDY Corporation, Neyagawa (JP)

( * ) Notice: Subject to any disclaimer, the term of this patent is extended or adjusted under 35 U.S.C. 154(b) by 0 days.

(21) Appl. No.: 18/340,718

(22) Filed: Jun. 23, 2023

(65) Prior Publication Data

US 2024/0035544 A1    Feb. 1, 2024

(30) Foreign Application Priority Data

Jul. 28, 2022   (JP) ................................ 2022-120805

(51) Int. Cl.
*F16F 15/139*    (2006.01)
*F16D 13/50*    (2006.01)

(52) U.S. Cl.
CPC ........ *F16F 15/1397* (2013.01); *F16D 13/505* (2013.01)

(58) Field of Classification Search
CPC ............................ F16F 15/1397; F16D 13/505
USPC ...................................................... 192/70.17
See application file for complete search history.

(56) References Cited

U.S. PATENT DOCUMENTS

| | | | | |
|---|---|---|---|---|
| 4,928,486 | A * | 5/1990 | Despres | F16H 45/02 |
| | | | | 192/214.1 |
| 5,622,087 | A * | 4/1997 | Schierling | F16F 15/1315 |
| | | | | 192/30 R |
| 7,726,449 | B2 * | 6/2010 | Yabe | F16D 7/025 |
| | | | | 192/208 |
| 2001/0035321 | A1 * | 11/2001 | Yabe | F16H 45/02 |
| | | | | 192/55.61 |
| 2003/0221926 | A1 * | 12/2003 | Arhab | F16H 45/02 |
| | | | | 192/55.61 |

FOREIGN PATENT DOCUMENTS

JP      2021055810 A      4/2021

* cited by examiner

*Primary Examiner* — Colby M Hansen
(74) *Attorney, Agent, or Firm* — United IP Counselors, LLC (57) ABSTRACT

A power transmission device includes a flywheel, a torque limiter unit, and a damper unit. The torque limiter unit includes first and second side plates and a friction plate. The first side plate is attached to the flywheel. The first side plate is disposed on a first axial side to the flywheel. The friction plate is disposed axially between the first side plate and the second side plate. The damper unit includes input rotational bodies, an output plate, and an elastic member. The output plate is disposed axially between the first side plate and the flywheel.

8 Claims, 6 Drawing Sheets

POWER TRANSMISSION DEVICE

CROSS-REFERENCE TO RELATED APPLICATIONS

This application is based on and claims the priority benefit of Japanese application 2022-120805 filed Jul. 28, 2022, the contents of which are incorporated herein by reference.

BACKGROUND OF THE INVENTION

Field of the Invention

The present invention relates to a power transmission device.

Description of the Related Art

Power transmission devices are configured to absorb torque fluctuation of an engine. The power transmission devices include a flywheel, a torque limiter unit, and a damper unit (e.g., Patent Literature 1). The damper unit is attached to the flywheel via the torque limiter unit. The torque limiter unit is configured to restrict transmission of torque with a predetermined value or more, between the flywheel and the damper unit.

Patent Literature 1: JP 2021-55810A

SUMMARY OF THE INVENTION

There is a desire to reduce the cost of the power transmission device configured as described above. In view of this, an object of the present invention is to provide a power transmission device capable of reducing the cost.

A power transmission device according to a first aspect includes a flywheel, a torque limiter unit, and a damper unit. The torque limiter unit is attached to the flywheel. The damper unit is attached to the torque limiter unit. The torque limiter unit includes a first and second side plates, and a friction plate. The first side plate is attached to the flywheel. The first side plate is disposed on a first axial side to the flywheel. The second side plate configured to rotate integrally with the first side plate. The second side plate is disposed on the second axial side with respect to the first side plate. The friction plate is disposed axially between the first side plate and the second side plate. The damper unit includes an input rotational body, an output plate, and an elastic member. The input rotational body is configured to rotate integrally with the friction plate. The output plate is disposed to be rotatable relative to the input rotational body. The output plate is disposed axially between the first side plate and the flywheel. The elastic member elastically couples the input rotational body to the output plate.

According to the above configuration, the output plate is disposed between the first side plate and the flywheel. Accordingly, the first side plate and the flywheel do not interfere with each other when rotating relative to each other. And thus, when the first side plate and the output plate are cut from a single member, a step of cutting an outer circumferential surface of the output plate can be omitted, and the cost can be reduced.

A power transmission device according to a second aspect is the power transmission device according to the first aspect that employs the following configuration. The first side plate includes an outer circumferential portion and an inner circumferential portion. The inner circumferential portion is disposed on the first axial side with respect to the outer circumferential portion.

A power transmission device according to a third aspect is the power transmission device according to the first or second aspect that employs the following configuration. The flywheel includes a body portion and an attachment portion. The attachment portion is disposed radially outward of the body portion. The attached portion protrudes toward the first axial side from the body portion. The first side plate is attached to the attachment portion. The output plate is disposed between the first side plate and the body portion.

A power transmission device according to a fourth aspect is the power transmission device according to the third aspect that employs the following configuration. The flywheel includes a protruding portion. The protruding portion is disposed radially outward of the attachment portion. The protruding portion protrudes toward the first axial side with respect to the attachment portion.

A power transmission device according to a fifth aspect is the power transmission device according to any one of the first to fourth aspects that employs the following configuration. The input rotational body includes a first input plate and a second input plate. The friction plate is attached to the first input plate. The second input plate is disposed on the second axial side with respect to the first input plate. The second input plate is configured to rotate integrally with the first input plate.

A power transmission device according to a sixth aspect is the power transmission device according to any one of the first to fifth aspects that employs the following configuration. An outer diameter of the output plate is the same as an inner diameter of the first side plate.

A power transmission device according to a seventh aspect is the power transmission device according to any one of the first to sixth aspects that employs the following configuration. The friction plate is a separate member from the first input plate.

A power transmission device according to an eighth aspect is the power transmission device according to any one of the first to seventh aspects that employs the following configuration. The first side plate is disposed such that an inner circumferential surface of the first side plate does not face an outer circumferential surface of the output plate.

According to the present invention, a power transmission device capable of reducing the cost can be provided.

DESCRIPTION OF EMBODIMENTS

Overall Configuration

Figure 1:
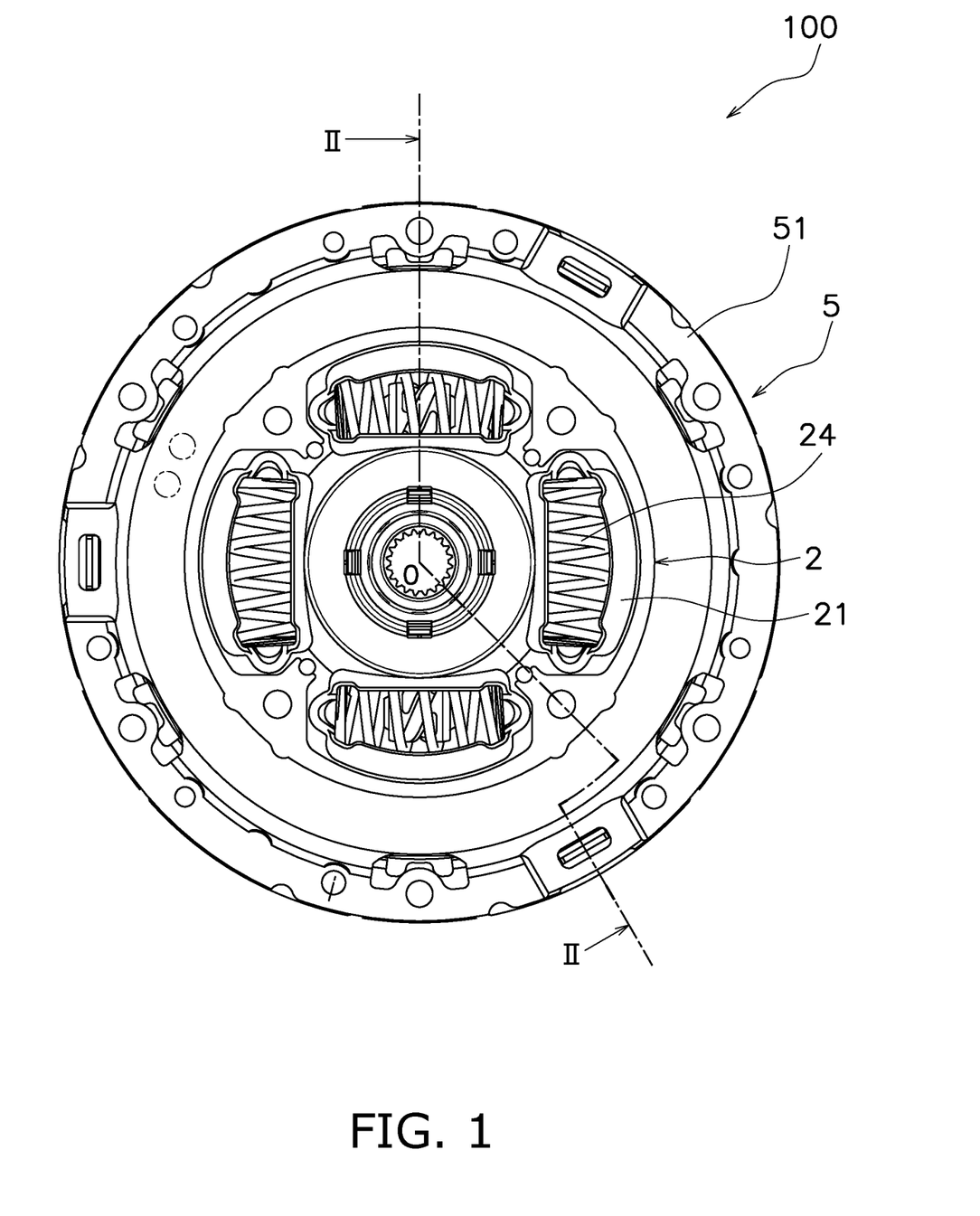
FIG. 1 is a front, axial view of a power transmission device.
Figure 2:
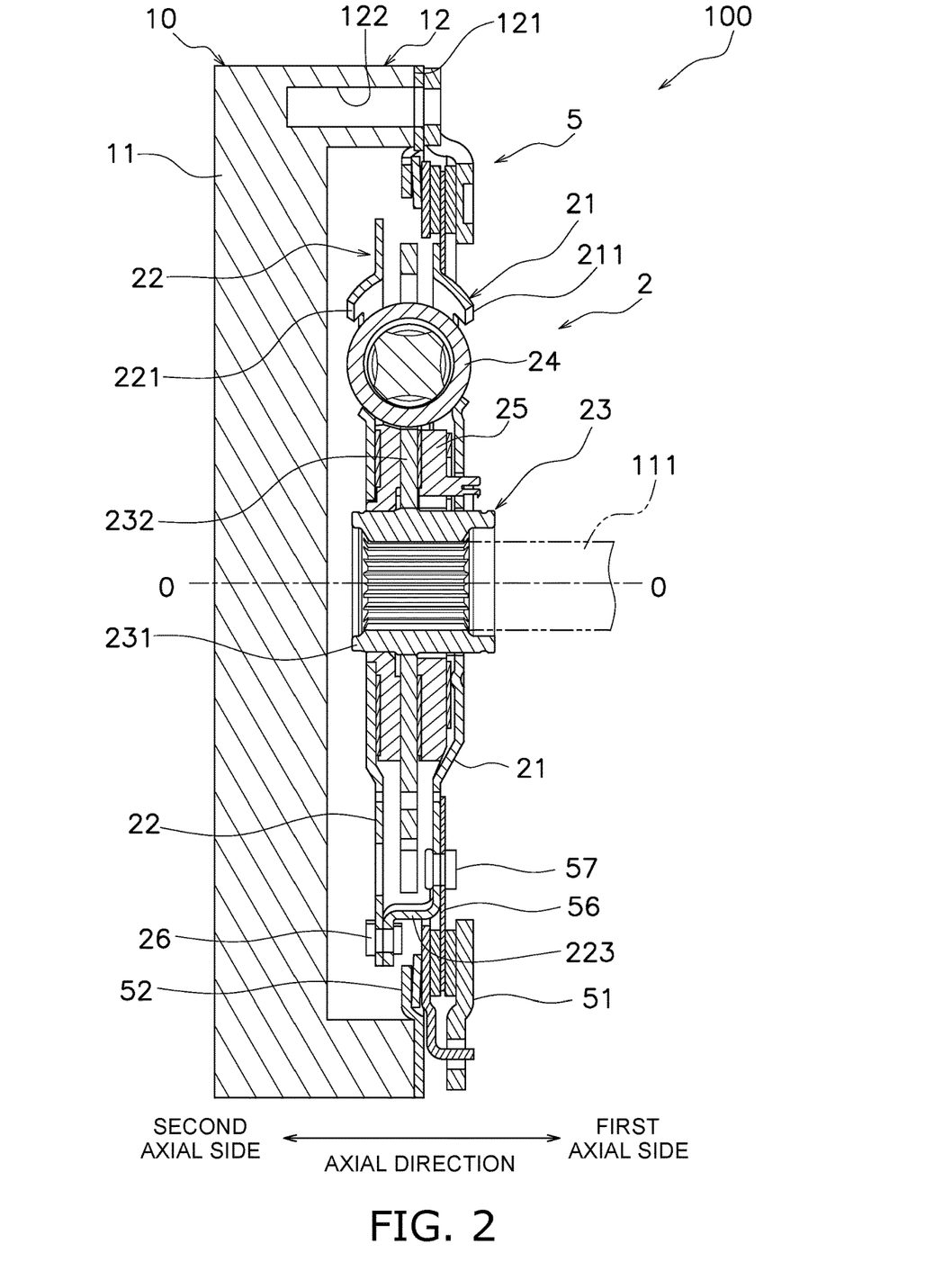
FIG. 2 is a cross-sectional view taken along line II-II in FIG. 1.

FIG. 1 is a front, axial view of a power transmission device 100 according to the present embodiment, and FIG. 2 is a cross-sectional view taken along the staggered line II-II in FIG. 1. In FIG. 2, line O-O is a rotational axis of the power transmission device 100. In FIG. 2, an engine (not shown) is disposed on the left side with respect to the power transmission device 100, and a drive unit (not shown) including a motor, a speed shifter, and the like is disposed on the right side with respect to the power transmission device 100.

Note that in the following description, an "axial direction" refers to the direction in which the rotational axis O of the power transmission device 100 extends. A "circumferential direction" refers to the circumferential direction of a circle centered about the rotational axis O, and a "radial direction" refers to a radial direction of the circle centered about the rotational axis O. Note that, the circumferential direction need not necessarily exactly match the circumferential direction of the circle centered about the rotational axis O, and the radial direction need not necessarily exactly match the diameter direction of the circle centered about the rotational axis O.

As shown in FIGS. 1 and 2, the power transmission device 100 is provided between the engine and an input shaft 111 of the drive unit. The power transmission device 100 is configured to restrict torque transmitted between the engine and the drive unit, and attenuate rotational fluctuation. The power transmission device 100 includes a flywheel 10, a torque limiter unit 5, and a damper unit 2.

Flywheel

The flywheel 10 is disposed so as to be rotatable around the rotational axis O. The flywheel 10 includes a body portion 11 and an attachment portion 12. The body portion 11 and the attachment portion 12 are integrally formed as a single member. Note that the body portion 11 may be formed as a separate member from the attachment portion 12. In this case, the body portion 11 can be a flexible plate.

The body portion 11 is formed in a disc-like shape. The attachment portion 12 is disposed radially outward of the body portion 11. The attachment portion 12 has an annular shape that extends in the circumferential direction. The attachment portion 12 protrudes toward the first axial side with respect to the body portion 11.

The attachment portion 12 includes an attachment surface 121. The attachment surface 121 faces toward the first axial side. The attachment surface 121 has an annular shape as seen in the axial direction. The attachment portion 12 includes a plurality of screw holes 122 in the attachment surface 121. The plurality of screw holes 122 are arranged in the circumferential direction. The attachment portion 12 also includes a plurality of knock pins (not shown). The plurality of knock pins are arranged in the circumferential direction. The knock pins protrude from the attachment surface 121 toward the first axial side. By inserting the knock pins into knock pin holes formed in an outer circumferential portion of torque limiter unit 5, the torque limiter unit 5 is positioned with respect to the flywheel 10.

Torque Limiter Unit 5

The torque limiter unit 5 is configured to be attached to the flywheel 10. Specifically, an outer circumferential portion of the torque limiter unit 5 is attached to the attachment portion 12 of the flywheel 10.

The torque limiter unit 5 is disposed radially outward of the damper unit 2. The torque limiter unit 5 is configured to restrict torque transmitted between the flywheel 10 and the damper unit 2. In other words, the torque limiter unit 5 is configured to restrict the transmission of torque with a predetermined value or more.

Figure 3:
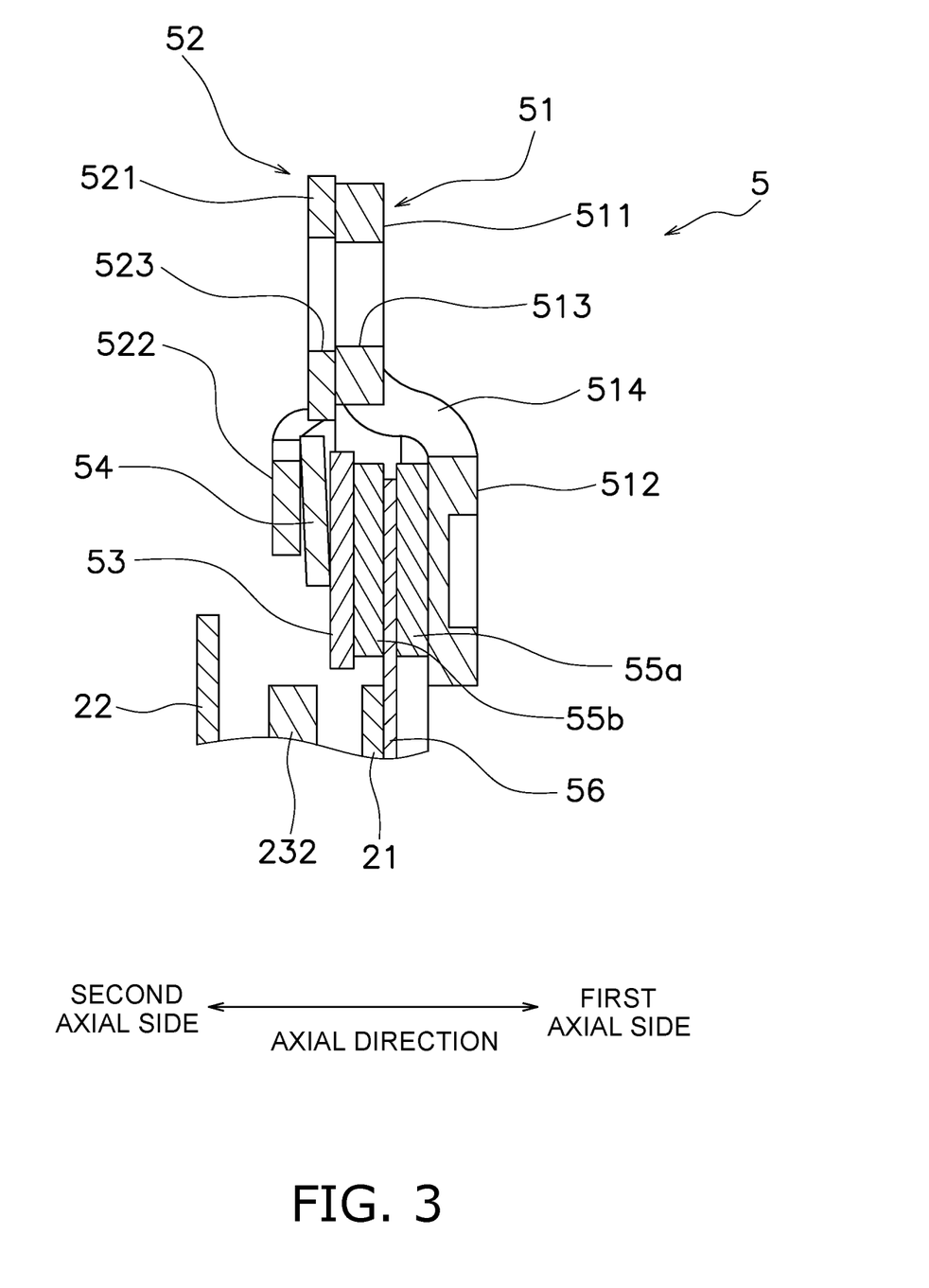
FIG. 3 is an enlarged sectional view of a torque limiter unit.

As shown in FIG. 3, the torque limiter unit 5 includes a first side plate 51, a second side plate 52, a pressure plate 53, a cone spring 54, a first friction member 55a, a second friction member 55b, and a friction plate 56.

First Side Plate

The first side plate 51 has an annular shape. The first side plate 51 is attached to the flywheel 10. Specifically, the first side plate 51 is attached to the attachment portion 12 of the flywheel 10. The first side plate 51 is disposed on the first axial side with respect to the flywheel 10.

The first side plate 51 includes an outer circumferential portion 511 and an inner circumferential portion 512. The inner circumferential portion 512 of the first side plate 51 is subjected to a biasing force from a cone spring 54.

The outer circumferential portion 511 of the first side plate 51 is configured to be attached to the flywheel 10. Specifically, the outer circumferential portion 511 includes a through hole 513 through which is passed a bolt (not shown) that is to be screwed into a screw hole 122.

The inner circumferential portion 512 of the first side plate 51 is disposed on the first axial side with respect to the outer circumferential portion 511. The inner circumferential portion 512 is linked to the outer circumferential portion 511 via a link portion 514 that extends in the axial direction.

Second Side Plate

The second side plate 52 is configured to rotate integrally with the first side plate 51. Specifically, the second side plate 52 is fixed to the flywheel 10 together with the first side plate 51 using a bolt (not shown) that is screwed into the screw hole 122. The second side plate 52 is disposed on the second axial side with respect to the first side plate 51.

The second side plate 52 has an annular shape. The outer diameter of the second side plate 52 is substantially the same as the outer diameter of the first side plate 51. The inner diameter of the second side plate 52 is larger than the inner diameter of the first side plate 51.

The second side plate 52 includes an outer circumferential portion 521 and an inner circumferential portion 522. The outer circumferential portion 521 of the second side plate 52 is configured to be attached to the flywheel 10. Specifically, the outer circumferential portion 521 includes a through hole 523 through which is passed a bolt (not shown) that is to be screwed into the screw hole 122.

The outer circumferential portion 521 of the second side plate 52 is in contact with the outer circumferential portion 511 of the first side plate 51. On the other hand, the inner circumferential portion 522 of the second side plate 52 is disposed spaced apart from the first side plate 51 in the axial direction. The thickness of the second side plate 52 is smaller than the thickness of the first side plate 51.

Friction Plate

The friction plate 56 has an annular shape. The friction plate 56 is configured to rotate integrally with first and second input plates 21 and 22 (described later). Specifically, the friction plate 56 is attached to the first input plate 21. The friction plate 56 is disposed on the first axial side with respect to the first input plate 21. The friction plate 56 is thinner than the first input plate 21. The friction plate 56 is disposed axially between the first side plate 51 and the second side plate 52.

Second Fastening Portion

As shown in FIG. 2, the second fastening portion 57 fastens the friction plate 56 to the damper unit 2. Specifically, the second fastening portion 57 fastens the friction plate 56 to the first input plate 21. The second fastening portion 57 is disposed radially inward of the first fastening portion 26 (described later). Note that the second fastening portion 57 may be a rivet, for example.

Friction Member

As shown in FIG. 3, the first and second friction members 55a and 55b each have an annular shape. The first friction member 55a is disposed axially between the friction plate 56 and the first side plate 51. The second friction member 55b is disposed axially between the friction plate 56 and the second side plate 52. Specifically, the second friction member is disposed axially between the friction plate 56 and the pressure plate 53.

The first and second friction members 55a and 55b are attached to the friction plate 56. The first friction member 55a is frictionally engaged with the first side plate 51. The second friction member 55b is frictionally engaged with the pressure plate 53. Upon receiving torque with a predetermined value or more, the first friction member 55a slides against the first side plate 51 and the second friction member 55b slides against the pressure plate 53. As a result of this, the first side plate 51 and the friction plate 56 rotate relative to each other. Note that the first friction member 55a may be fixed to the first side plate 51, and frictionally engaged with the friction plate 56. The second friction member 55b may be fixed to the pressure plate 53 and frictionally engaged with the friction plate 56.

Pressure Plate

The pressure plate 53 has an annular shape. The pressure plate 53 is disposed axially between the first side plate 51 and the second side plate 52. Specifically, the pressure plate 53 is disposed axially between the second friction member 55b and the cone spring 54.

Cone Spring

The cone spring 54 is disposed axially between the second side plate 52 and the pressure plate 53. Note that the cone spring 54 is in contact with an inner circumferential portion 522 of the second side plate 52. The cone spring 54 biases the pressure plate 53 toward the first axial side. With this, the pressure plate 53 and the first side plate 51 sandwich the friction plate 56 and the first and second friction members 55a and 55b.

Damper Unit

As shown in FIG. 2, the damper unit 2 is attached to the torque limiter unit 5. The damper unit 2 is configured to attenuate rotational fluctuation. The damper unit 2 includes the first input plate 21, the second input plate 22, a hub flange 23, and a plurality of elastic members 24. The damper unit 2 includes a hysteresis generating mechanism 25. Note that the first input plate 21 and the second input plate 22 correspond to an input rotational body of the present invention.

First and Second Input Plates

The first input plate 21 and the second input plate 22 rotate integrally with each other. The first input plate 21 and the second input plate 22 are not capable of moving relative to each other in the axial direction. The first input plate 21 and the second input plate 22 are configured to rotate integrally with the friction plate 56. Specifically, the friction plate 56 is attached to the first input plate 21. Note that the friction plate 56 is a separate member from the first input plate 21, but the friction plate 56 may be configured as a single member that is formed integrally with the first input plate 21. Both the first input plate 21 and the second input plate 22 are annular members having a center hole.

The first input plate 21 and the second input plate 22 are disposed spaced apart from each other in the axial direction. The second input plate 22 is disposed on the second axial side with respect to the first input plate 21. The second input plate 22 is disposed on the second axial side with respect to the second side plate 52.

The first input plate 21 includes a plurality of first window portions 211. Note that in the present embodiment, the first input plate 21 includes four first window portions 211. The first window portions 211 are arranged in the circumferential direction.

The second input plate 22 includes a plurality of second window portions 221. Note that in the present embodiment, the second input plate 22 includes four second window portions 221. The second window portions 221 are arranged in the circumferential direction.

The second window portions 221 are disposed at locations that respectively overlap the first window portions 211 as seen in the axial direction.

First Fastening Portion

The first fastening portions 26 fasten the first input plate 21 to the second input plate 22. The first fastening portions 26 may be rivets, for example. The first fastening portions 26 are disposed on the second axial side with respect to the second side plate 52. The first fastening portions 26 are disposed so as to overlap the first side plate 51 as seen in the axial direction.

Hub Flange

A hub flange 23 is configured to transmit torque from the first and second input plates 21 and 22 to a device on the output side. The hub flange 23 includes a hub 231 and a flange plate 232 (an example of the output plate). The hub 231 and the flange plate 232 are integrally formed in one piece by a plurality of teeth and a plurality of recessed portions with which the teeth are engaged.

The hub 231 has a tubular shape and is disposed in the center holes of the first input plate 21 and the second input plate 22. A spline hole axially extending is formed in an inner circumferential portion of the hub 231. The input shaft 111 that is a member on the output side can be spline-engaged with this spline hole.

The flange plate 232 radially extends from an outer circumferential surface of the hub 231. The flange plate 232 has an annular shape. The flange plate 232 is disposed so as to be rotatable relative to the first input plate 21 and the second input plate 22.

The flange plate 232 is disposed axially between the first input plate 21 and the second input plate 22. The flange plate 232 is disposed axially between the first side plate 51 and the flywheel 10. Specifically, the flange plate 232 is disposed axially between the first side plate 51 and the body portion 11. In other words, the first side plate 51, the flange plate 232, and the body portion 11 of the flywheel 10 are disposed in this order from the first axial side.

The flange plate 232 is disposed such that the outer circumferential surface thereof does not face the inner circumferential surface of the first side plate 51. Specifically, the outer circumferential surface of the flange plate 232 is disposed on the second axial side with respect to the inner circumferential surface of the first side plate 51. Thus, the first side plate 51 and the flange plate 232 do not interfere with each other. Note that the inner circumferential surface is a surface facing radially inward and the outer circumferential surface is a surface facing radially outward.

Figure 4:
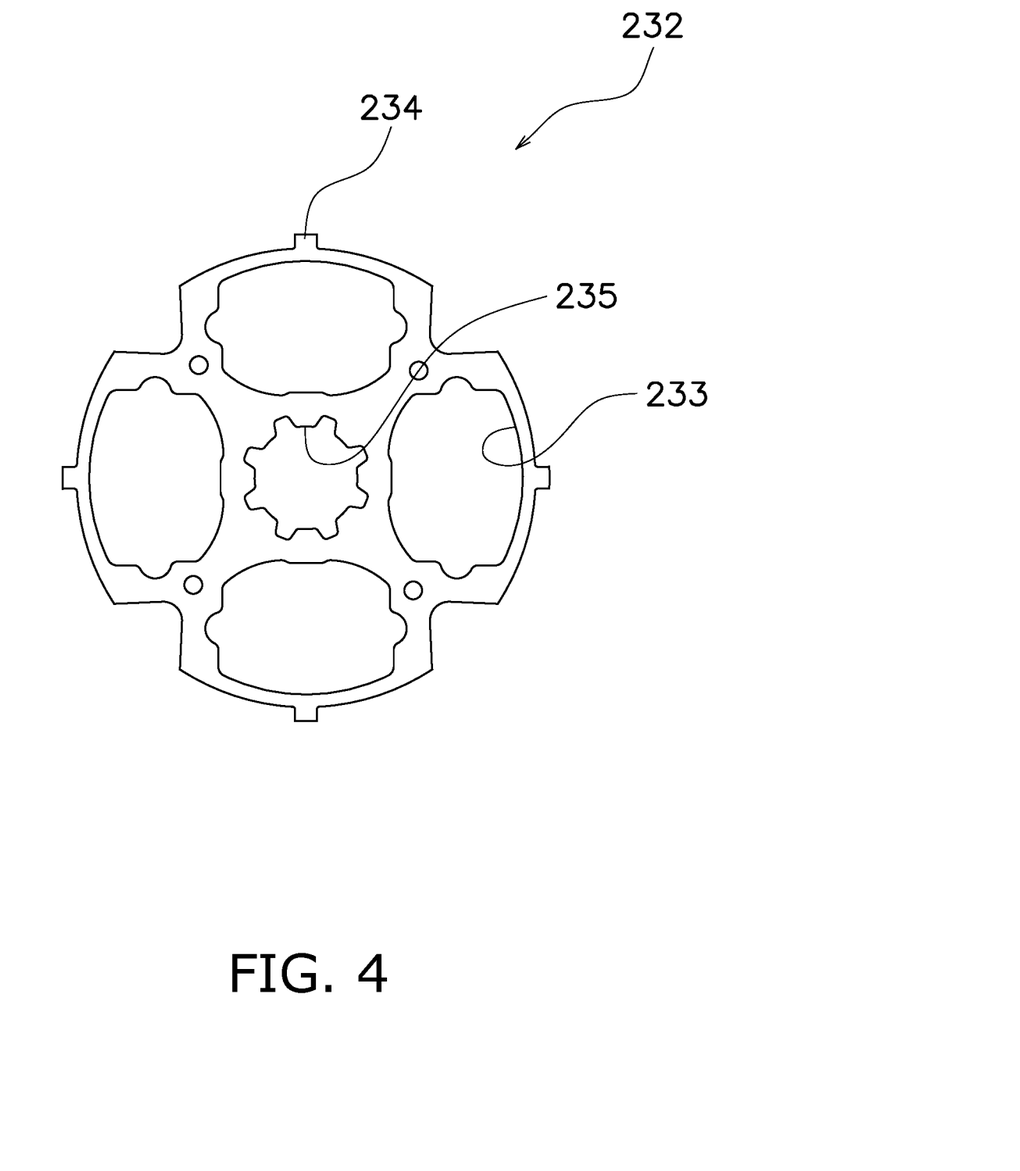
FIG. 4 is a front view of a flange plate.

FIG. 4 is a front, axial view of the flange plate 232. As shown in FIG. 4, the flange plate 232 has a disc-like shape. The flange plate 232 includes a center hole 235 and a plurality of housing holes 233. Note that in the present embodiment, the flange plate 232 includes four housing holes 233. The housing holes 233 are arranged in the circumferential direction. As seen in the axial direction, the housing holes 233 are disposed at locations that correspondingly overlap the first window portions 211 and the second window portions 221.

The hub 231 extends inside the center hole 235 of the flange plate 232. The plurality of teeth formed on the outer circumferential surface of the hub 231 are engaged with the plurality of recessed portions formed on an inner wall surface that defines the center hole 235. With this, the hub 231 and the flange plate 232 integrally rotate.

The flange plate 232 includes a plurality of stopper portions 234. In the present embodiment, the flange plate 232 includes four stopper portions 234. The stopper portions 234 protrude radially outward from the outer periphery of the flange plate 232. As a result of the stopper portions 234 coming into contact with the extended portions 223 of the second input plate 22 (see FIG. 2), rotation of the first and second input plates 21 and 22 relative to the flange plate 232 is restricted.

Figure 5:
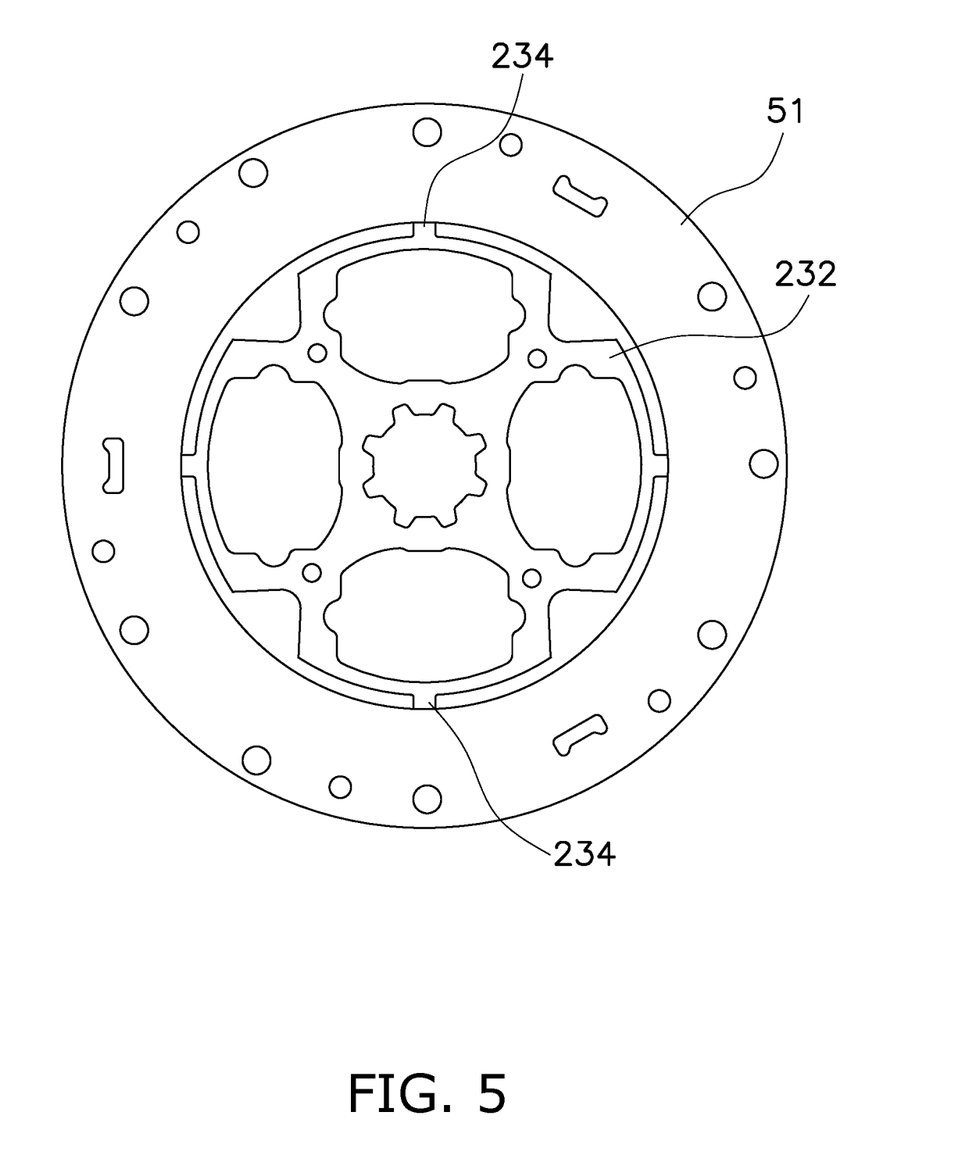
FIG. 5 is a front view of a single plate provided with the flange plate and a first side plate.

As shown in FIG. 5, the outer diameter of the flange plate 232 is the same as the inner diameter of the first side plate 51. Note that in the present embodiment, the outer diameter of the flange plate 232 means a length from a leading end of a stopper portion 234 to a leading end of another stopper portion 234 disposed on the opposite side thereto. Also, the thickness of the first side plate 51 is the same as the thickness of the flange plate 232. For this reason, the first side plate 51 and the flange plate 232 can be cut from a single plate of material (e.g., metal). Further, since the inner circumferential surface of the first side plate 51 does not face the outer circumferential surface of the flange plate 232, interference between the inner circumferential surface of the first side plate 51 and the outer circumferential surface of the flange plate 232 can be prevented without cutting the outer circumferential portion of the flange plate 232. In other words, in the present embodiment, the leading end surfaces of the stopper portions 234 do not interfere with the inner circumferential surface of the first side plate 51, even without cutting or trimming the leading end portions of the stopper portions 234 of the flange plate 232. For this reason, the step of cutting the leading end portions of the stopper portions 234 can be omitted, and as a result, manufacturing costs can be reduced.

Elastic Member

As shown in FIG. 1 and FIG. 2, elastic members 24 are configured to elastically couple the first and second input plates 21 and 22 and the flange plate 232 in the rotational direction. The elastic members 24 may be coil springs, for example.

The elastic members 24 are housed in the housing holes 233 of the flange plate 232. Also, the elastic members 24 are housed in the first window portions 211 of the first input plate 21 and are also housed in the second window portions 221 of the second input plate 22.

Operation

Torque transmitted from the engine to the flywheel 10 is input to the damper unit 2 via the torque limiter unit 5. The torque is input to the first and second input plates 21 and 22 of the damper unit 2, and then the torque is transmitted to the hub flange 23 via the elastic members 24. Then, power is transmitted from the hub flange 23 to the motor, the power generator, the speed shifter, and the like on the output side.

Further, for example, when starting the engine, since the inertia amount on the output side is large, excessive torque may be transmitted from the output side to the engine. In such a case, the torque transmitted to the engine side is restricted to a predetermined value or less by the torque limiter unit 5.

Variation

The scope of the claimed invention is not limited to the embodiment described above, and various alterations and modifications can be made without departing from the scope of the present invention.

Figure 6:
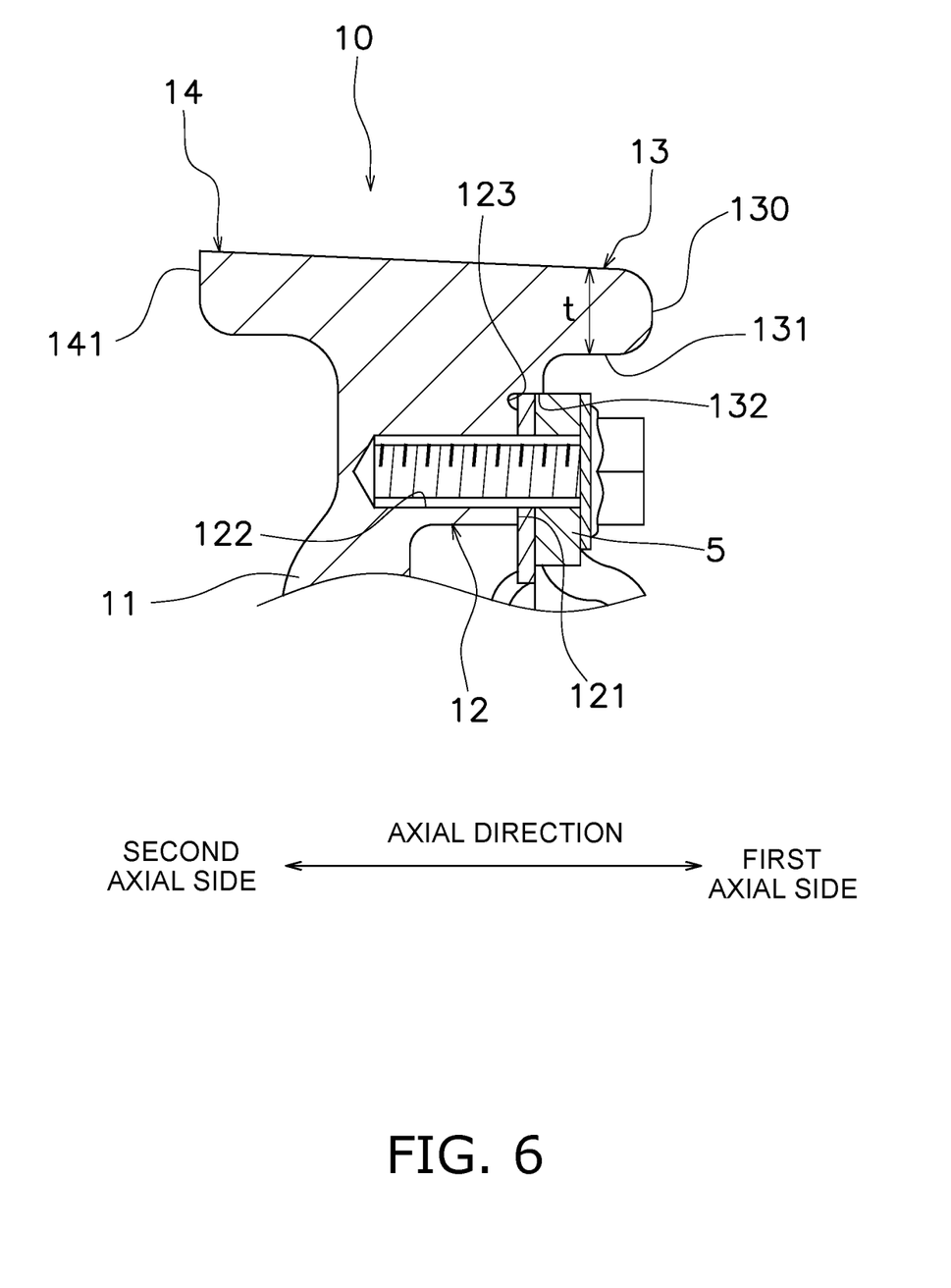
FIG. 6 is an enlarged sectional view of a flywheel according to a variation.

(a) As shown in FIG. 6, the flywheel 10 may include a first protruding portion 13 (an example of the protruding portion). The first protruding portion 13 is disposed radially outward of the attachment portion 12. The first protruding portion 13 has an annular shape extending in the circumferential direction. The first protruding portion 13 protrudes toward the first axial side with respect to the attachment portion 12. In other words, a leading end surface 130 of the first protruding portion 13 is located on the first axial side with respect to the attachment surface 121 of the attachment portion 12. Note that the leading end surface 130 of the first protruding portion 13 faces toward the first axial side.

A thickness t of the first protruding portion 13 gradually decreases toward the first axial side. The outer diameter of the first protruding portion 13 gradually decreases toward the first axial side.

The first protruding portion 13 includes a first inner circumferential surface 131 and a second inner circumferential surface 132. The second inner circumferential surface 132 is disposed on the second axial side with respect to the first inner circumferential surface 131. The inner diameter of the second inner circumferential surface 132 is smaller than the inner diameter of the first inner circumferential surface 131. The second inner circumferential surface 132 is in contact with the outer circumferential surface of the torque limiter unit 5. Note that the first inner circumferential surface 131 is disposed spaced apart from the torque limiter unit 5 in the radial direction.

Further, the flywheel 10 may include a second protruding portion 14. The second protruding portion 14 is disposed radially outward of the attachment portion 12. The second protruding portion 14 has an annular shape extending in the circumferential direction. The second protruding portion 14 protrudes toward the second axial side with respect to the attachment portion 12. In other words, the second protruding portion 14 protrudes toward the opposite side to the first protruding portion 13. A leading end surface 141 of the second protruding portion 14 is located on the second axial side with respect to the body portion 11. Note that the leading end surface 141 of the second protruding portion 14 faces toward the second axial side.

The outer diameter of the second protruding portion 14 gradually decreases toward the first axial side. The outer diameter of the flywheel 10 gradually decreases toward the first axial side. The inner diameter of the second protruding portion 14 gradually decreases toward the first axial side.

Further, the attachment portion 12 may include a groove portion 123 in an outer circumferential end portion of the attachment surface 121. The groove portion 123 extends in the circumferential direction. As seen from the first axial side, the groove portion 123 has an annular shape.

(b) In the above embodiment, the hub flange 23 is constituted by two members, namely, the hub 231 and the flange plate 232. However, the hub flange 23 may be integrally formed as a single member.

LIST OF REFERENCE NUMERALS

2 Damper unit
21 First input plate

22 Second input plate
232 Flange plate
24 Elastic member
5 Torque limiter unit
51 First side plate
511 Outer circumferential portion
512 Inner circumferential portion
52 Second side plate
56 Friction plate
10 Flywheel
11 Body portion
12 Attachment portion
13 First protruding portion
100 Power transmission device

What is claimed is:

1. A power transmission device, comprising:
a flywheel;
a torque limiter unit attached to the flywheel; and
a damper unit attached to the torque limiter unit,
wherein the torque limiter unit includes
a first side plate attached to the flywheel and disposed on a first axial side with respect to the flywheel;
a second side plate configured to rotate integrally with the first side plate and disposed on a second axial side with respect to the first side plate; and
a friction plate disposed axially between the first side plate and the second side plate, and
the damper unit includes
an input rotational body configured to rotate integrally with the friction plate;
an output plate disposed axially between the first side plate and the flywheel, the output plate disposed to be rotatable relative to the input rotational body, and
an elastic member elastically coupling the input rotational body and the output plate.

2. The power transmission device according to claim 1, wherein the first side plate includes an outer circumferential portion and an inner circumferential portion disposed on the first axial side with respect to the outer circumferential portion.

3. The power transmission device according to claim 1, wherein
the flywheel includes a body portion and an attachment portion disposed radially outward of the body portion and protruding toward the first axial side from the body portion,
the first side plate is attached to the attachment portion, and
the output plate is disposed between the first side plate and the body portion.

4. The power transmission device according to claim 3, wherein the flywheel includes a protruding portion disposed radially outward of the attachment portion and protruding toward the first axial side with respect to the attachment portion.

5. The power transmission device according to claim 1, wherein the input rotational body includes a first input plate to which the friction plate is attached and a second input plate disposed on the second axial side with respect to the first input plate and configured to rotate integrally with the first input plate.

6. The power transmission device according to claim 1, wherein an outer diameter of the output plate is the same as an inner diameter of the first side plate.

7. The power transmission device according to claim 1, wherein the friction plate is a separate member from the first input plate.

8. The power transmission device according to claim 1, wherein the first side plate is disposed such that an inner circumferential surface of the first side plate does not face an outer circumferential surface of the output plate.

* * * * *